(12) United States Patent
Ovens

(10) Patent No.: US 6,574,020 B1
(45) Date of Patent: Jun. 3, 2003

(54) SYSTEM AND METHOD FOR OPTICALLY AND MECHANICALLY COUPLING AN AVIONICS LINE REPLACEABLE UNIT WITH OTHER EQUIPMENT ON AN AIRCRAFT

(75) Inventor: Norman Ovens, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/401,234

(22) Filed: Sep. 23, 1999

(51) Int. Cl.[7] ............................................. H04B 10/00
(52) U.S. Cl. ...................................... 359/152; 359/163
(58) Field of Search ............................... 359/152, 115, 359/124, 163; 340/945

(56) References Cited

U.S. PATENT DOCUMENTS

| 4,198,118 | A | * | 4/1980 | Porter .......................... 385/24 |
| 5,930,428 | A | * | 7/1999 | Irwin et al. .................... 385/88 |
| 6,366,375 | B1 | * | 4/2002 | Sakai et al. ................. 359/115 |

* cited by examiner

Primary Examiner—Nina Tong
(74) Attorney, Agent, or Firm—Nathan O. Jensen; Kyle Eppele

(57) ABSTRACT

An avionics system for communication between avionics LRUs in an aircraft cockpit instrument panel in which each avionics LRU includes mounted thereon, an optical transceiver and where the aircraft instrument panel has an optical back plane over which signals are sent between the avionics LRU, thereby reducing the need for wiring harnesses customarily associated with interconnecting various avionics LRUs in an aircraft instrument panel.

2 Claims, 2 Drawing Sheets

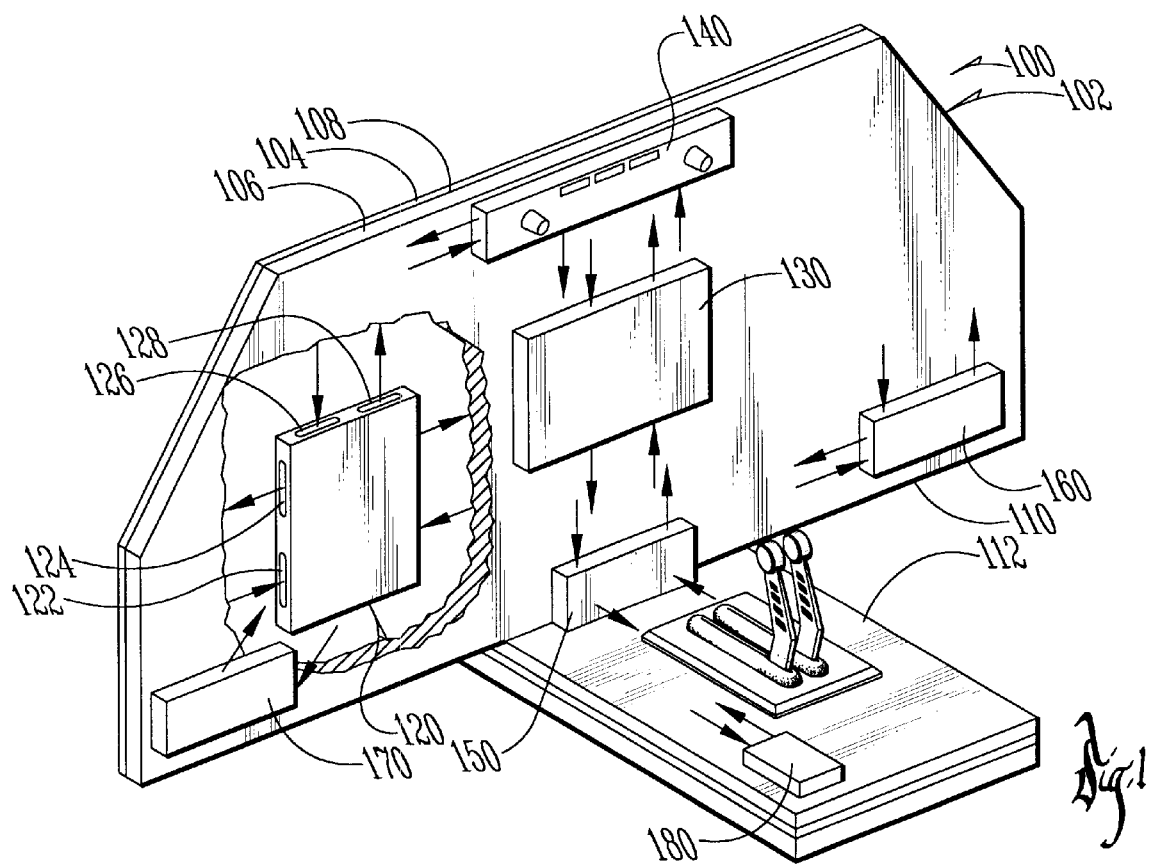
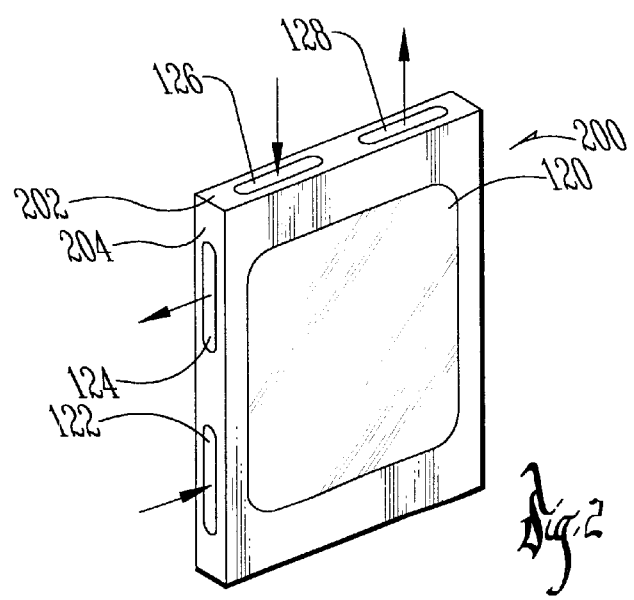

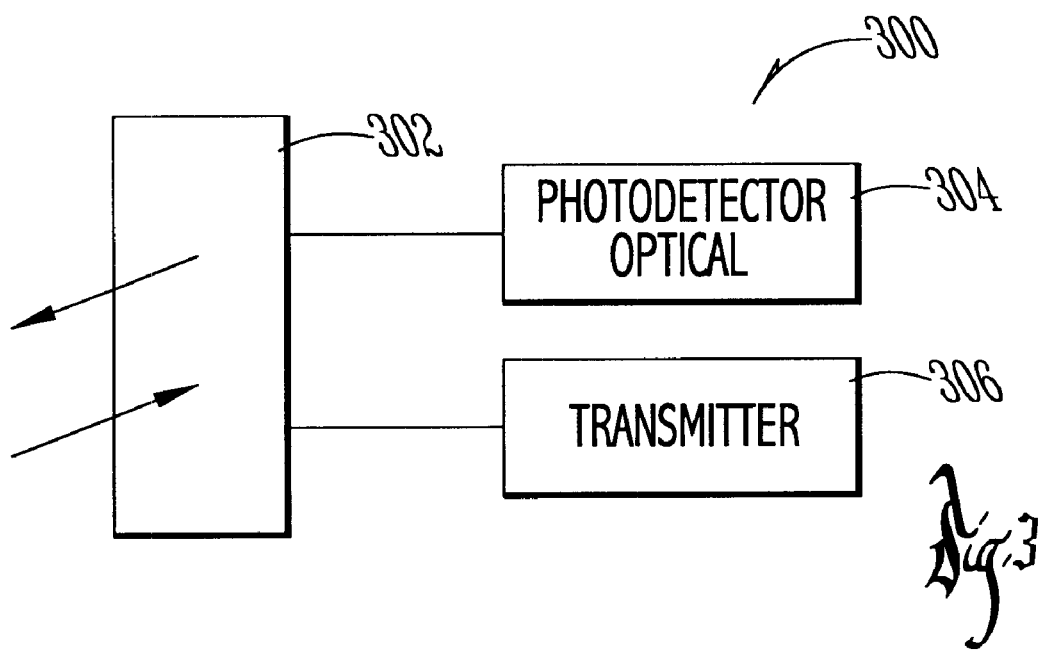

SYSTEM AND METHOD FOR OPTICALLY AND MECHANICALLY COUPLING AN AVIONICS LINE REPLACEABLE UNIT WITH OTHER EQUIPMENT ON AN AIRCRAFT

FIELD OF THE INVENTION

The present invention generally relates to aviation electronics or avionics, and more particularly relates to line replaceable units (LRUs) of avionics equipment which are mated together in an aircraft, and even more particularly relates to a system and method for optically and mechanically coupling such LRUs with other avionics equipment.

BACKGROUND OF THE INVENTION

In the past, designers of avionics systems have endeavored to provide systems with improved performance and weight characteristics. One crucial element in such systems has been the weight and cost associated with interconnecting various line replaceable units on the aircraft. Typically, this interconnection is accomplished with a myriad of wires and wiring harnesses.

While these wiring harnesses have many advantages and have enjoyed extensive use in the past, they also have significant drawbacks.

First of all, these wiring harnesses are usually associated with connectors in an instrument panel on the aircraft for receiving LRUs. These wiring harnesses and their associated connectors often consume a considerable amount of the permissible weight of an aircraft.

Secondly, when the line replaceable units are directly connected with each other, the amount of wiring that is needed increases dramatically with each new LRU added to the combination.

Consequently, there exists a need for improvement in avionics systems and methods for coupling LRUs to such systems.

SUMMARY OF THE INVENTION

It is an object of the present invention to provide reduced weight consumption for avionics LRUs and their interconnecting systems.

It is a feature of the present invention to utilize an optical backplane.

It is an advantage of the present invention to allow the LRU to be mated with other LRUs without any associated wiring harnesses.

It is another advantage of the present invention to eliminate the potential for electrical pin damage upon insertion of an LRU into a wiring harness connector.

The present invention is an apparatus and method for mating avionics LRUs with other electronic equipment, which is designed to satisfy the aforementioned needs, provide the previously stated objects, include the above-listed features and achieve the already articulated advantages. The present invention is carried out with a "wiring harness-less system" in a sense that the number of and weight of avionics LRU interconnect wiring harnesses has been greatly reduced.

Accordingly, the present invention is a system and method for mating avionics LRUs with other electronic equipment where the system includes an optically transmissive layer disposed on an avionics instrument panel and optical transmitters and receivers disposed on or about the LRUs for generation and reception of signals propagated over the optically transmissive layer.

BRIEF DESCRIPTION OF THE DRAWINGS

The invention may be more fully understood by reading the following description of the preferred embodiments of the invention, in conjunction with the appended drawings wherein:

FIG. 1 is a simplified perspective partial cut-away diagram of a system and environment of the present invention, where the arrows show possible light signal transmission paths about the instrument panel.

FIG. 2 is a perspective view of an LRU of the present invention, where the arrows show possible light signal transmission paths about the instrument panel.

FIG. 3 is a simplified block diagram of an optical transmitter/receiver assembly of the present invention, where the arrows show possible light signal transmission paths in and out of the transmitter/receiver assembly.

DETAILED DESCRIPTION

Now referring to the drawings, wherein like numerals refer to like matter throughout, and more particularly to FIG. 1, there is shown a system of the present invention, generally designated 100, which includes a cockpit instrument panel 102, which performs, among others, the well known function of supporting avionics display and controller LRUs in a convenient position with respect to the pilot. Cockpit instrument panel 102 is shown having a novel cockpit instrument panel optically transmissive layer 104 coupled thereto. Cockpit instrument panel optically transmissive layer 104 can be any type of optically transmissive material, depending upon the particular requirement for the aircraft. Cockpit instrument panel optically transmissive layer 104 is shown disposed on a back side, or distal to the pilot, of cockpit instrument panel 102 and coupled to cockpit instrument panel structural layer 106 which can be any suitable material. Cockpit instrument panel 102 has a cockpit instrument panel top 108 and a cockpit instrument panel bottom 110, as well as a pedestal panel 112, with a pedestal controller 180 thereon. Disposed in cockpit instrument panel 102 are various LRUs such as first display LRU 120, second display LRU 130, and controller LRU 140. These LRUs perform, among others, the well-known functions various types of LRUs which are commonly used in aircraft. First display LRU 120 is shown, in a partially cut-away section, having several optical transceivers thereon, including first optical transceiver assembly 122, second optical transceiver assembly 124, third optical transceiver assembly 126, fourth optical transceiver assembly 128.

Also shown in FIG. 1 are several interface units, such as pedestal optical interface unit 150, right optical interface unit 160, and left optical interface unit 170, which may be used for coupling avionics equipment located elsewhere to the LRUs disposed on the cockpit instrument panel 102. These interface units may be similar to the first optical transceiver assembly 122 disposed on first display LRU 120 except that they will have exterior electrical or optical connections for coupling with various other electronic equipment on board the aircraft.

Now referring to FIG. 2, there is shown an enlarged view of the first display LRU 120 of FIG. 1, which includes a top side 202 and a left side 204, with transceivers thereon. Top side 202 and left side 204 may include a clear resin surface within which transceivers are encapsulated. However, various other methods of attaching transceivers to sides of the LRUs can be used which are well known in the art. To avoid damage to the transceiver during the insertion process, a sliding protective device or other apparatus may be desirable to cover or otherwise protect the transceivers. This sliding protective device may be a retractable shield (not shown) or any other well-known mechanism capable of providing sufficient protection of the transceivers during LRU insertion.

Now referring to FIG. 3, there is shown a transceiver assembly, generally designated 300, which may represent a typical transceiver, such as first optical transceiver assembly 122. This typical transceiver may include a lens 302, a photodetector 304, and an optical transmitter 306, all of which are well known in the art. Various other configurations of a transceiver could be readily substituted, such as separate transmitters and receivers or a device which both emits radiation, as well as detects incident radiation thereon.

In operation, standard avionics equipment can be adapted for use on the present invention by including transceivers thereon for generating optical communication signals. The conversion of the typical electrical signals to optical signals is well known in the art, and it would be a matter of designer's choice as to whether a standard electrical output signal is generated and then converted to an optical signal, or if optical signals are generated without an intermediate electrical output signal. Various optical signaling protocols and methodologies could be employed, all of which are well known in the art and would also be a matter of designer's choice. The present invention is intended to be independent of the particular protocol and transceiver type, as well as other minor and well-known design details.

It is thought that the method and apparatus of the present invention will be understood from the foregoing description, and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. An avionics system comprising:

a cockpit instrument panel disposed in a position in an aircraft cockpit, the cockpit instrument panel having a port therein for receiving, an avionics line replaceable unit, said cockpit instrument panel having a region therein having a cockpit instrument panel structural layer and a cockpit instrument panel optically transmissive layer;

a first line replaceable unit of the type which communicates with other avionics equipment on an aircraft, disposed in said port;

a first optical transceiver assembly coupled to said first line replaceable unit for receiving signals over said cockpit instrument panel optically transmissive layer;

wherein said cockpit instrument panel includes a plurality of ports therein for receiving a plurality of avionics line replaceable units;

a second line replaceable unit disposed in one of said plurality of ports; and, a second optical transceiver assembly coupled to said second line replaceable unit for receiving signals over said cockpit instrument panel optically transmissive layer.

2. An apparatus for coupling several avionics line replaceable units in an aircraft, comprising:

optically transmissive means for propagating a light signal about an aircraft instrument panel;

means for transmitting light signals across said means for propagating;

means for receiving light signals transmitted across said means for propagating;

wherein said means for transmitting light signals across said means for propagating is mounted to an avionics line replaceable unit;

wherein said means for transmitting light signals across said means for propagating is mounted flush with the exterior surface of an avionics line replaceable unit and is aligned with said optically transmissive means for propagating when said avionics line replaceable unit is disposed in said aircraft instrument panel; and wherein said means for transmitting light signals across said means for propagating is protected during insertion of said avionics line replaceable unit into said aircraft instrument panel, by a retractable shield.

* * * * *